US007130591B2

(12) United States Patent
Iwai et al.

(10) Patent No.: US 7,130,591 B2
(45) Date of Patent: Oct. 31, 2006

(54) CELL PHONE

(75) Inventors: Hiroshi Iwai, Neyagawa (JP); Koichi Ogawa, Hirakata (JP); Kenichi Yamada, Yokohama (JP); Kazuhiko Ohta, Yokohama (JP); Tsukasa Takahashi, Kawasaki (JP); Masayoshi Hirai, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 487 days.

(21) Appl. No.: 10/311,313

(22) PCT Filed: Jun. 29, 2001

(86) PCT No.: PCT/JP01/05617

§ 371 (c)(1),
(2), (4) Date: Mar. 24, 2003

(87) PCT Pub. No.: WO02/03665

PCT Pub. Date: Jan. 10, 2002

(65) Prior Publication Data

US 2004/0253972 A1 Dec. 16, 2004

(30) Foreign Application Priority Data

Jun. 30, 2000 (JP) ............................ 2000-198326

(51) Int. Cl.
*H04B 1/38* (2006.01)

(52) U.S. Cl. ............... 455/90.3; 455/575.1; 455/575.3; 455/575.7; 455/575.5; 379/428.01; 379/429; 379/433.13; 430/567; 430/566; 430/619; 343/702

(58) Field of Classification Search ............... 455/90.3, 455/563, 575.1, 557, 575.3, 575.7, 566; 379/433.12, 379/433.06, 429, 433.13, 428.01; 343/702
See application file for complete search history.

(56) References Cited

U.S. PATENT DOCUMENTS 5,451,965 A 9/1995 Matsumoto
5,561,437 A 10/1996 Phillips et al.
5,668,867 A 9/1997 Nagai
5,809,433 A * 9/1998 Thompson et al. ...... 455/575.7
6,108,417 A * 8/2000 Thomas et al. ........ 379/433.13
6,125,289 A * 9/2000 Lee ......................... 455/575.3

(Continued)

FOREIGN PATENT DOCUMENTS

EP 0602828 6/1994

(Continued)

OTHER PUBLICATIONS

English Language Abstract of JP 6-311216.

(Continued)

*Primary Examiner*—Marceau Milord
(74) *Attorney, Agent, or Firm*—Greenblum & Bernstein, P.L.C.

(57) ABSTRACT

In a cellular phone terminal foldable by a hinge and including upper and lower split pieces, monopole antennas are formed on a flexible printed wiring board and a printed wiring board and a lower housing is formed with a finger grip portion such that not only deterioration of characteristics is prevented but the lower housing can be held easily.

16 Claims, 14 Drawing Sheets

U.S. PATENT DOCUMENTS

| | | | | |
|---|---|---|---|---|
| 6,230,028 | B1 * | 5/2001 | Shirakawa | 455/566 |
| 6,256,481 | B1 * | 7/2001 | Jeong et al. | 455/575.3 |
| 6,300,910 | B1 * | 10/2001 | Kim | 343/702 |
| 6,370,362 | B1 * | 4/2002 | Hansen et al. | 455/90.1 |
| 6,429,817 | B1 * | 8/2002 | Creigh et al. | 343/702 |
| 6,470,175 | B1 * | 10/2002 | Park et al. | 455/90.1 |
| 6,785,562 | B1 * | 8/2004 | Lee et al. | 455/566 |
| 6,907,276 | B1 * | 6/2005 | Toba | 455/566 |
| 6,944,433 | B1 * | 9/2005 | Ogino | 455/277.1 |

FOREIGN PATENT DOCUMENTS

| | | |
|---|---|---|
| EP | 0720339 | 7/1996 |
| JP | 6-232950 | 8/1994 |
| JP | 6-311216 | 11/1994 |
| JP | 8-97622 | 4/1996 |
| JP | 8-186628 | 7/1996 |
| JP | 09-018220 | 1/1997 |
| JP | 9-18220 | 1/1997 |
| JP | 10-308618 | 11/1998 |
| JP | 10308618 | 11/1998 |
| JP | 11122037 | 4/1999 |

OTHER PUBLICATIONS

English Language Abstract of JP 9-18220.
English Language Abstract of JP 10-308618.
English Language Abstract of JP 11-122037.

* cited by examiner

Fig. 2A
Fig. 2B
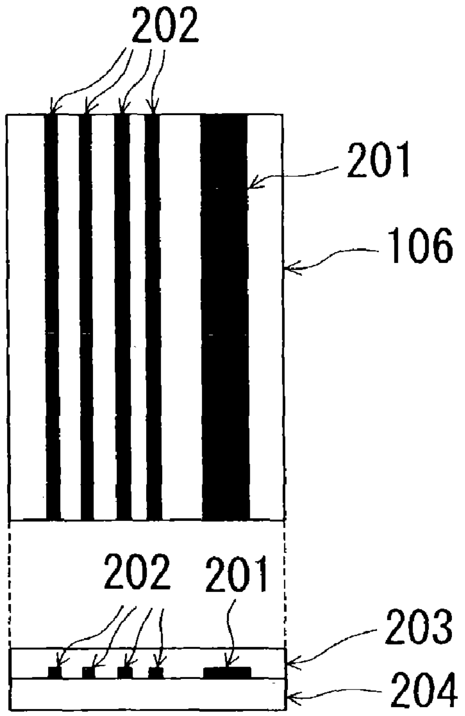
Fig. 3A
Fig. 3B
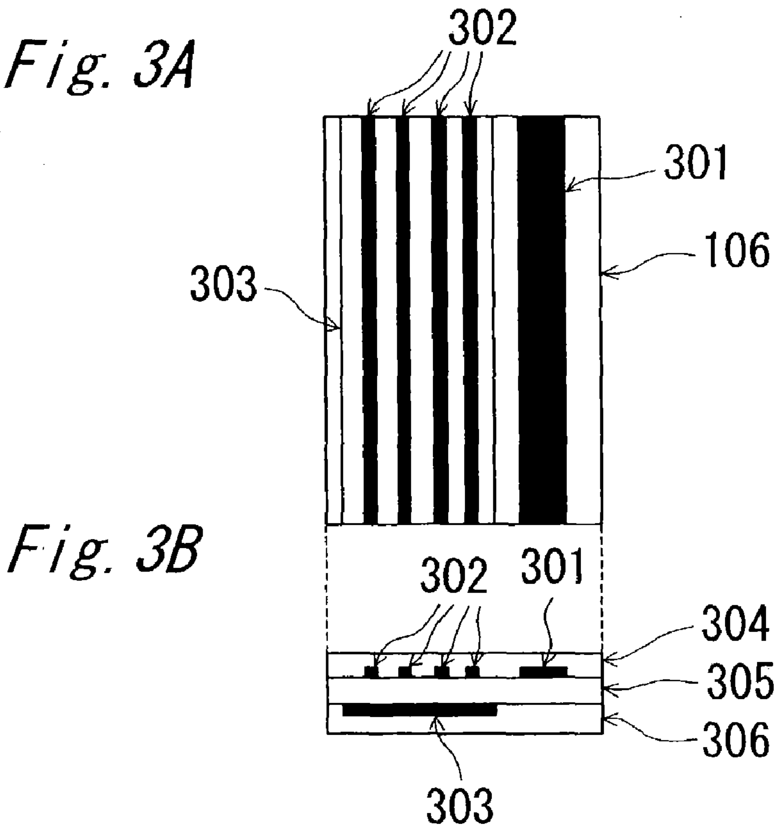

CELL PHONE

TECHNICAL FIELD

The present invention generally relates to cellular phone terminals and more particularly, to a foldable cellular phone terminal.

BACKGROUND ART

An example of a conventional foldable cellular phone terminal is shown in FIGS. 8A and 8B. In FIGS. 8A and 8B, "801" denotes an upper housing, "802" a lower housing "803" a hinge, "804" an upper printed board, "805" a lower printed board, "806" a flexible printed wiring board, "807" an external antenna, "808" a strip line antenna, "809" an upper connector, "810" a lower connector and "811" a feeding point for the strip line antenna 808.

In the upper and lower housings 801 and 802 acting as two split pieces folded on each other by the hinge 803 in the arrangement shown in FIGS. 8A and 8B, a portion of a conductive pattern line on the flexible printed wiring board 806 for electrically connecting the upper printed board 804 and the lower printed board 805 is used as the strip antenna 808 and a portion of the upper connector 809 acts as the feeding point 811 for the strip line antenna 808 as disclosed in Japanese Patent Laid-Open Publication No. 10--3.08618 (1998).

Meanwhile, FIGS. 9A and 9B show an example of an arrangement in which an external antenna used for both transmission and reception is provided in a lower housing. In FIGS. 9A and 9B, "901" denotes an upper housing, "902" a lower housing, "903" a hinge, "904" an upper printed board, "905" a lower printed board, "906" a flexible printed wiring board, "907" an external antenna, "908" a built-in antenna, "909" an upper connector and "910" a lower connector. In this case, the built-in antenna 908 is provided in the lower housing 902.

Furthermore, FIGS. 10A and 10B show an example of an arrangement in which one turn of a flexible printed wiring board is passed through a hinge. In FIGS. 10A and 10B, "1001" denotes an upper housing, "1001*a*" a front casing of the upper housing 1001, "1001*b*" a rear cover of the upper housing 1001, "1001*c*" a hinge of the upper housing 1001, "1001*d*" and "1001*e*" semicircular hinges of the upper housing 1001, "1002" a lower housing, "1002*a*" a front casing of the lower housing 1002, "1002*b*" a rear cover of the lower housing 1002, "1002*c*" a hinge of the lower housing 1002, "1002*d*" and "1002*e*" semicircular hinges of the lower housing 1002, "1003" an external antenna, "1004" a receiver, "1005" a display unit, "1006" dial buttons, "1007" a transmitter, "1008" a flexible printed wiring board and "1009" a coaxial cable. In this case, the upper housing 1001 provided with the external antenna 1003 and the receiver 1004 and the lower housing 1002 provided with the transmitter 1007 are rotated about an axis of the hinges 1001*c* and 1002*c* so as to be folded on each other.

The semicircular hinges 1001*d* and 1001*e* disposed at a central portion of the hinge 1001*c* and the semicircular hinges 1002*d* and 1002*e* disposed at a central portion of the hinge 1002*c* are formed hollowly. One turn of the flexible printed wiring board 1008 is passed along an inside diameter of the semicircular hinges 1001*d*, 1001*e*, 1002*d* and 1002*e*, while the coaxial cable 1009 is inserted into the turn of the flexible printed wiring board 1008 and extends along the flexible printed wiring board 1008 so as to be connected to the external antenna 1003 as disclosed in Japanese Patent Laid-Open Publication No. 6-311216 (1994).

However, in the conventional cellular phone terminal shown in FIGS. 8A and 8B, such a problem arises that since shape of the strip line antenna 808 formed on the flexible printed wiring board 806 changes greatly between a folding state and an unfolding state of the conventional cellular phone terminal, its impedance characteristics change extraordinarily. In addition, in case element duration is equal to about (λ/2), such a drawback is also incurred that since electric current is concentrated at the strip line antenna 808, introduction of noise into other signal conductor lines becomes intense.

Meanwhile, in case the built-in antenna 908 is provided in the lower housing 902 as shown in FIGS. 9A and 9B, the lower housing 902 is usually gripped by a hand when the prior art cellular phone terminal is held by the hand, so that deterioration of characteristics of the built-in antenna 908 becomes heavier disadvantageously.

Moreover, in case a strip line antenna is formed on the flexible printed wiring board 1008 and element duration is not more than (λ/2) in the known arrangement of FIGS. 10A and 10B in which one turn of the flexible printed wiring board 1008 is passed along an inside diameter of the hollow formed at the central portion of the hinges 1001*c* and 1002*c* so as to be passed therethrough, electric currents flow in opposite directions on the strip line antenna wound one turn so as to cancel each other, thereby resulting in inconvenient drop of radiant efficiency.

DISCLOSURE OF INVENTION

The present invention has for its object to provide a foldable cellular phone terminal in which the above mentioned drawbacks of prior art are eliminated.

In order to accomplish the object, a cellular phone terminal of the present invention is characterized in that monopole antennas are formed on a flexible printed wiring board and printed boards connected foldably by the flexible printed wiring board. Meanwhile, in an arrangement in which one turn of the flexible printed wiring board is wound around a hinge, there is a feature that the monopole antennas are spaced away from an external antenna. Furthermore, there is another feature that a finger grip portion is provided on a lower housing.

BRIEF DESCRIPTION OF DRAWINGS

FIGS. 2A and 2B are, respectively, a front elevational view and a transverse sectional view showing an arrangement of a flexible printed wiring board employed in the cellular phone terminal of FIG. 1.

FIGS. 3A and 3B are, respectively, a front elevational view and a transverse sectional view showing an arrangement of a flexible printed wiring board employed in a cellular phone terminal according to a second embodiment of the present invention.

BEST MODE FOR CARRYING OUT THE INVENTION (First Embodiment)

Figure 1A:
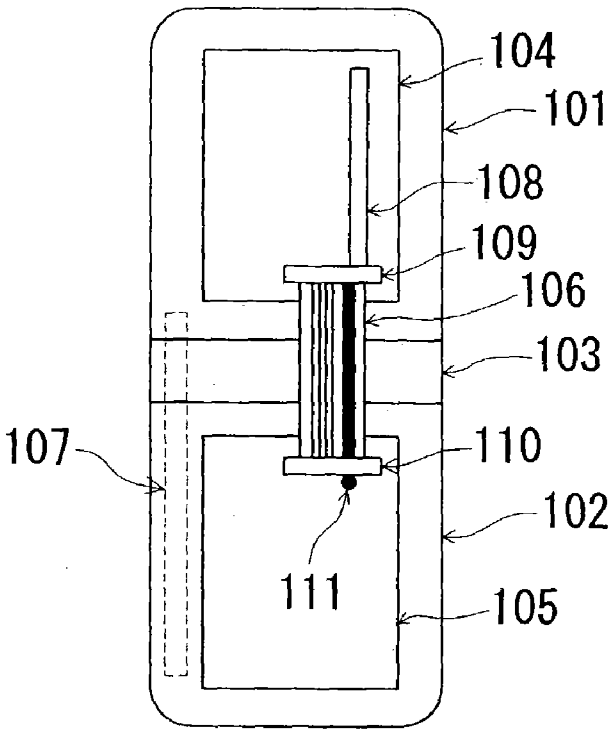
FIGS. 1A and 1B are, respectively, a cutaway front elevational view and a longitudinal sectional view showing an arrangement of a cellular phone terminal according to a first embodiment of the present invention.
Figure 1B:
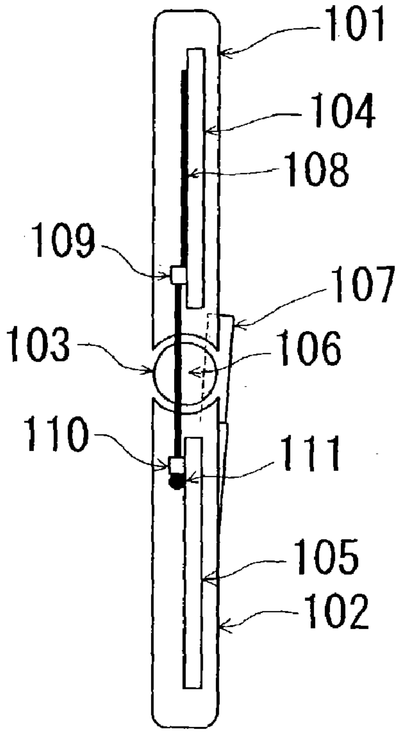

Hereinafter, a first embodiment of the present invention is described with reference to FIGS. 1A and 1B and FIGS. 2A and 2B. FIGS. 1A and 1B show an example of an arrangement of a cellular phone terminal according to the first embodiment of the present invention. In FIGS. 1A and 1B, “101” denotes an upper housing, “102” a lower housing, “103” a hinge, “104” an upper printed board, “105” a lower printed board, “106” a flexible printed wiring board, “107” an external antenna, “108” a conductive pattern, “109” an upper connector, “110” a lower connector and “111” an antenna feeding point.

FIGS. 2A and 2B shows an example of an arrangement of the flexible printed wiring board 106 of FIGS. 1A and 1B. In FIGS. 2A and 2B, “201” denotes an antenna conductive pattern, “202” a conductive pattern, “203” an upper cover film and “204” a lower cover film. At this time, a monopole antenna is constituted by the antenna conductive pattern 201 on the flexible printed wiring board 106 and the conductive pattern 108 and is fed from the antenna feeding point 111 on the lower printed board 105.

In case a length of the monopole antenna is set at about (λ/2), electric current on the lower printed board 105 decreases, so that it will be possible to restrain deterioration of characteristics, which is caused by holding the lower housing 102 with a hand. In addition, in case a length of the flexible printed wiring board 106 is not more than one fourth of a wavelength, antinode of standing wave in current distribution on the antenna is present on the conductive pattern 108. In such a case, since radiant characteristics of the monopole antenna are substantially determined by the conductive pattern 108, changes of the radiant characteristics upon unfolding and folding of the cellular phone terminal can be lessened. Furthermore, since node of standing wave in current distribution is present in the neighborhood of the antenna feeding point 111, changes of current distribution upon unfolding and folding of the cellular phone terminal are small, so that it will be possible to restrain changes of impedance characteristics. In addition, since electric current on the flexible printed wiring board 106 decreases, introduction of noise into other signal conductor lines can be restrained than that of prior art.

Meanwhile, in this embodiment, the flexible printed wiring board 106 is connected to the upper and lower printed boards 104 and 105 by the upper and lower connectors 109 and 110, respectively by way of example. However, it is needless to say that the flexible printed wiring board 106 may be formed integrally with the upper and lower printed boards 104 and 105. Especially, when the upper printed board 104 and the flexible printed wiring board 106, which include the monopole antenna, are formed integrally with each other, it is possible to upgrade degree of freedom of design of the monopole antenna.

Meanwhile, if a passive element is provided adjacent to a whole or a portion of the monopole antenna of this embodiment, element duration of the monopole antenna can be shortened but the monopole antenna operates in the same mechanism as this embodiment.

Also in case a microstrip line is formed by bringing ground close to a portion of the monopole antenna of this embodiment, the same effects as those of this, embodiment can be gained.

Meanwhile, in case a great influence of introduction of noise into other signal conductor lines is exerted by an antenna element on the flexible printed wiring board 106, it is considered that a microstrip line is formed by bringing ground close to a portion or a whole of the antenna element on the flexible printed wiring board 106. In this case, the antenna element on the flexible printed wiring board 106 may function as a part of the monopole antenna.

It is to be noted that the monopole antenna is not necessarily used exclusively for reception. In this embodiment, the monopole antenna is used in combination with the external antenna 107 as an example. However, it is needless to say that the monopole antenna can be used for both transmission and reception. In this case, it is possible to perform diversity reception by combining the monopole antenna with another built-in antenna.

Meanwhile, position of the external antenna 107 is not restricted to that shown in FIGS. 1A and 1B and it is natural that only a built-in antenna may also be provided by eliminating the external antenna 107.

(Second Embodiment)

Hereinafter, a second embodiment of the present invention is described with reference to FIGS. 3A and 3B. FIGS. 3A and 3B show an example of an arrangement of a flexible printed wiring board 106 employed in a cellular phone terminal according to the second embodiment of the present invention. In FIGS. 3A and 3B, "301" denotes an antenna conductive pattern, "302" an upper conductive pattern, "303" a lower conductive pattern, "304" an upper cover film, "305" an intermediate cover film and "306" a lower cover film.

Figures 4A, 4B:
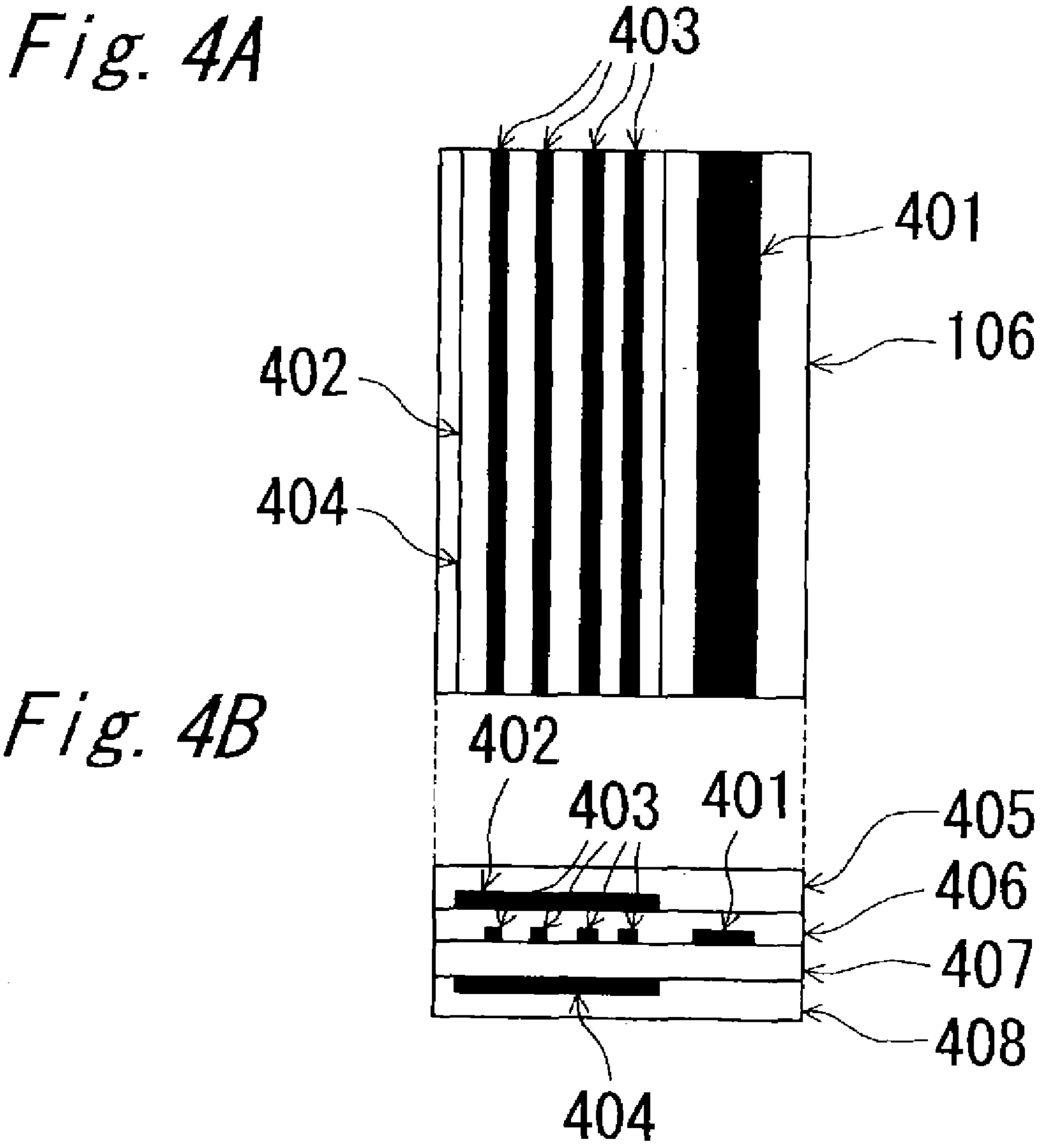
FIGS. 4A and 4B are, respectively, a front elevational view and a transverse sectional view showing an arrangement of a flexible printed wiring board which is a modification of the flexible printed wiring board of FIG. 3.

In FIGS. 4A and 4B showing a modification of the flexible printed wiring board 106 of FIG. 3, "401" denotes an antenna conductive pattern, "402" a first conductive pattern, "403" a second conductive pattern, "404" a third conductive pattern, "405" a first cover film, "406" a second cover film, "407" a third cover film and "408" a fourth cover film.

Meanwhile, in this embodiment, the antenna conductive patterns 301 and 401 are, respectively, formed in the same layers as those of the conductive patterns 302 and 403 by way of example but the present invention is not restricted to this arrangement.

In FIGS. 3A and 3B, a microstrip line is constituted by the upper conductive pattern 302 acting as a signal conductor line and the lower conductive pattern 303 acting as a ground wire. By this arrangement, it is possible to lessen the influence of noise introduction exerted by the antenna, etc., which is effective for a case in which thickness of the flexible printed wiring board 106 is limited by its hardness or strength.

In FIGS. 4A and 4B, a triplate line is formed in which the second conductive pattern 403 acting as a signal conductor line is interposed between the first and third conductive pattern 402 and 404 each acting as a ground wire. By this arrangement, the influence of noise introduction exerted by the antenna, etc. can be further lessened than that of FIGS. 3A and 3B.

Meanwhile, if a passive element is provided adjacent to a whole or a portion of the antenna conductive pattern of this embodiment, element duration of the monopole antenna can be shortened but the monopole antenna operates in the same mechanism as this embodiment.

Meanwhile, in order to shorten element duration of the monopole antenna, it is considered that ground is brought close to a portion of the antenna conductive pattern in the same manner as the first embodiment and thus, introduction of noise into other signal conductor lines can be restrained effectively.

(Third Embodiment)

Figure 5A:
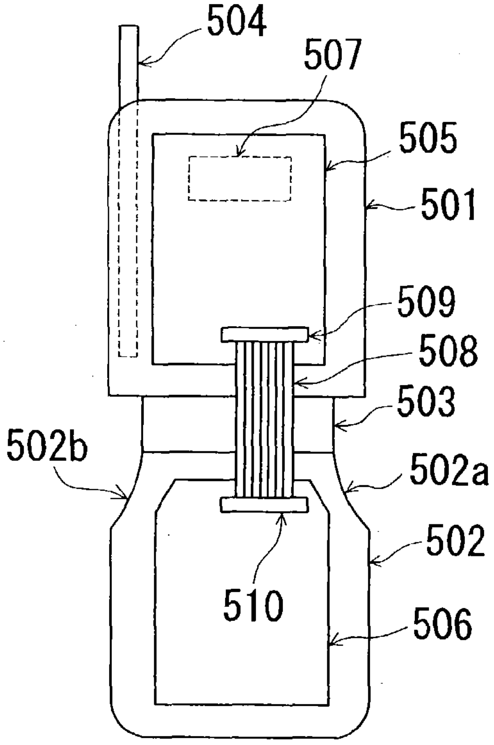
FIGS. 5A and 5B are, respectively, cutaway front elevational views showing an arrangement and a hand-held state of a cellular phone terminal according to a third embodiment of the present invention.
Figure 5B:
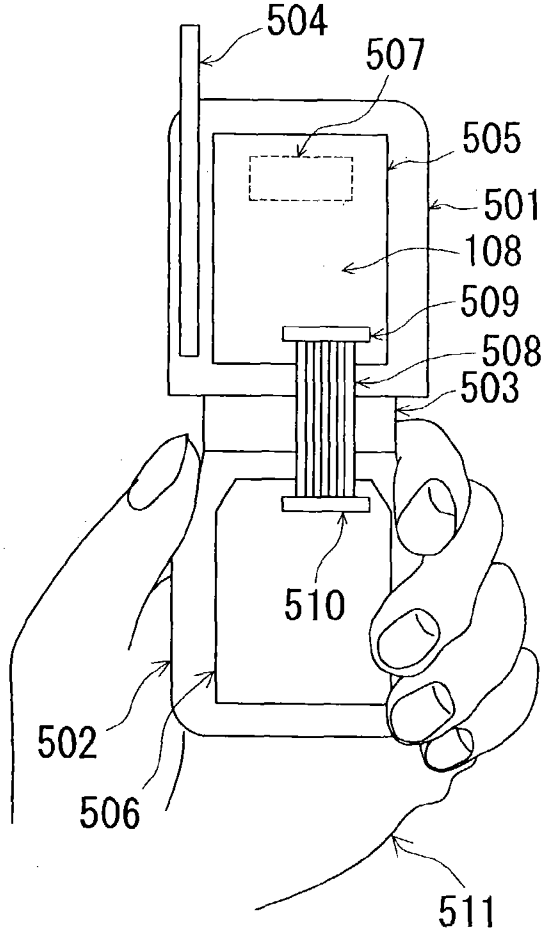

Hereinafter, a third embodiment of the present invention is described with reference to FIGS. 5A and 5B. FIGS. 5A and 5B show an example of an arrangement of a cellular phone terminal according to the third embodiment of the present invention, in which a concavely recessed finger grip is provided in a lower housing. In FIGS. 5A and 5B, "501" denotes an upper housing, "502" a lower housing, "502*a*" a first finger grip portion, "502*b*" a second finger grip portion, "503" a hinge, "504" an external antenna, "505" an upper printed board, "506" a lower printed board, "507" a built-in antenna, "508" a flexible printed wiring board, "509" an upper connector, "510" a lower connector and "511" a left hand. In this embodiment, the cellular phone terminal is held by the left hand 511 by way of example but may be, needless to say, held by a right hand.

Figure 6A:
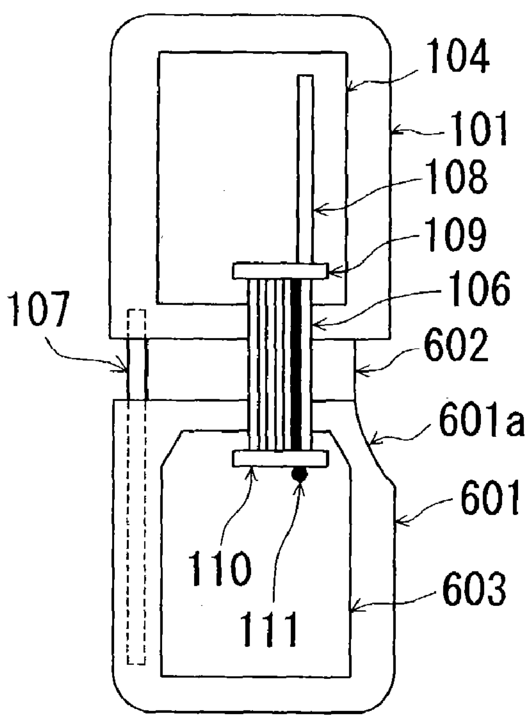
FIGS. 6A and 6B are, respectively, cutaway front elevational views showing arrangements of cellular phone terminals which are first and second modifications of the cellular phone terminal of FIG. 5.
Figure 6B:
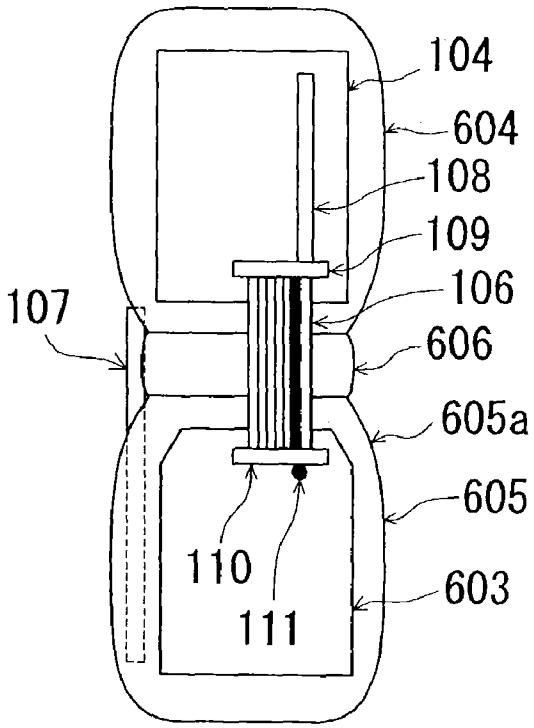

In FIGS. 6A and 6B showing first and second modifications of the cellular phone terminal of FIG. 5, respectively, "601" and "605" denote lower housings, "601*a*" and "605*a*" finger grip portions, "602" and "606" hinges, "603" a lower printed board, "604" an upper housing.

In the arrangement of FIGS. 5A and 5B, the external antenna 504 and the built-in antenna 507 are provided in the upper housing 501. On the other hand, in the arrangements of FIGS. 6A and 6B, the external antenna 107 is provided in the lower housings 601 and 605 and a monopole antenna is formed on the upper printed board 104 and the flexible printed wiring board 106. In this case, grounds of the upper printed boards 505 and 104 and the lower printed boards 506 and 603 are electrically connected to each other only by ground wires of the flexible printed wiring boards 508 and 106 and thus, the upper printed boards 505 and 104 and the lower printed boards 506 and 603 are in a very weak grounding state.

In such a case, it is considered that grounds of the upper housings 501 and 101 and the lower housings 502 and 601 are not common with each other. Namely, when the lower housings 502 and 601 are held by a hand, it can be expected that characteristics of the external antenna 504 and the built-in antenna 507 provided in the upper housing 501 do not deteriorate. Likewise, when the lower housing 601 is held by a hand, it can be expected that characteristics of the monopole antenna provided in the upper housing 101 do not deteriorate.

Figure 8A:
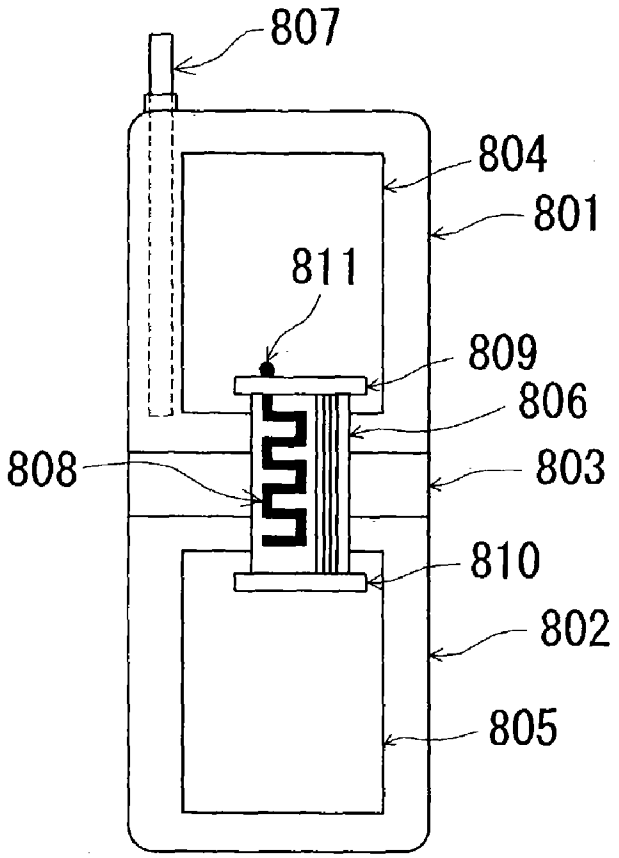
FIGS. 8A and 8B are, respectively, a cutaway front elevational view and a longitudinal sectional view showing an arrangement of a first prior art cellular phone terminal.
Figure 8B:
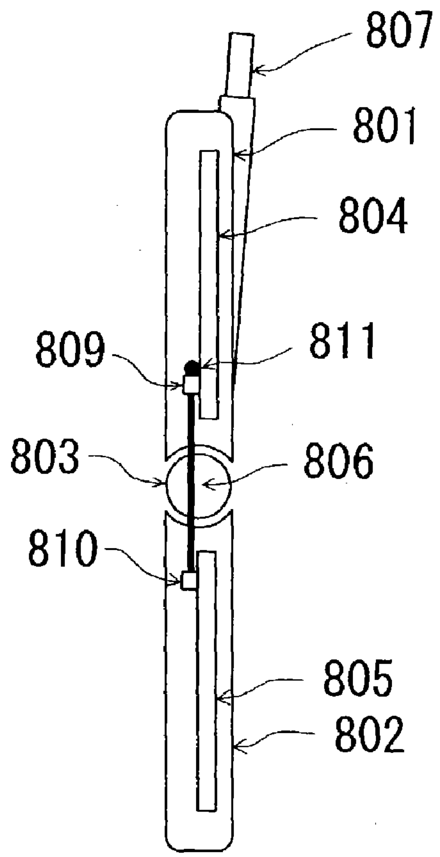
Figure 9A:
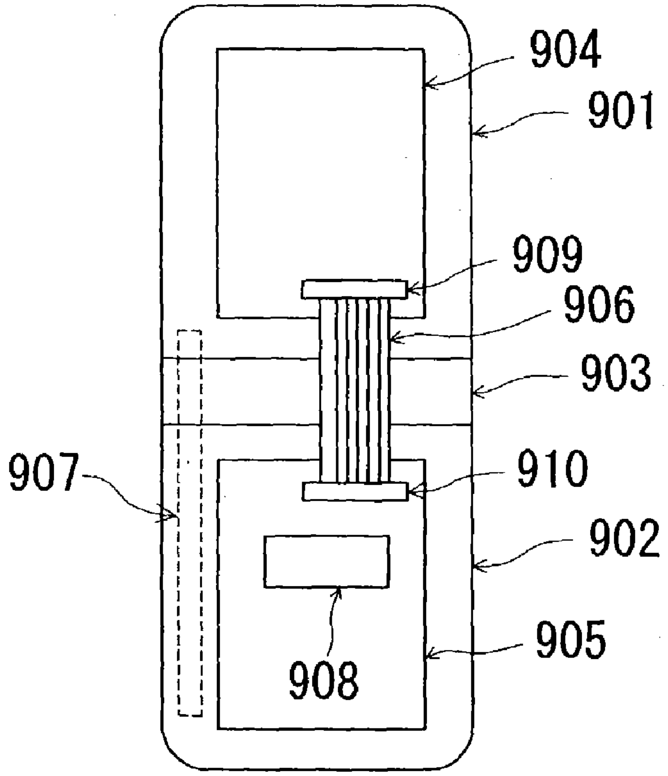
FIGS. 9A and 9B are, respectively, a cutaway front elevational view and a longitudinal sectional view showing an arrangement of a second prior art cellular phone terminal.
Figure 9B:
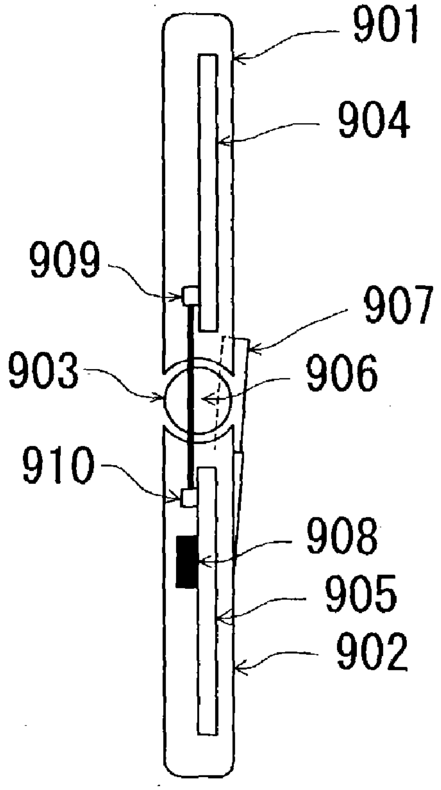
Figure 10A:
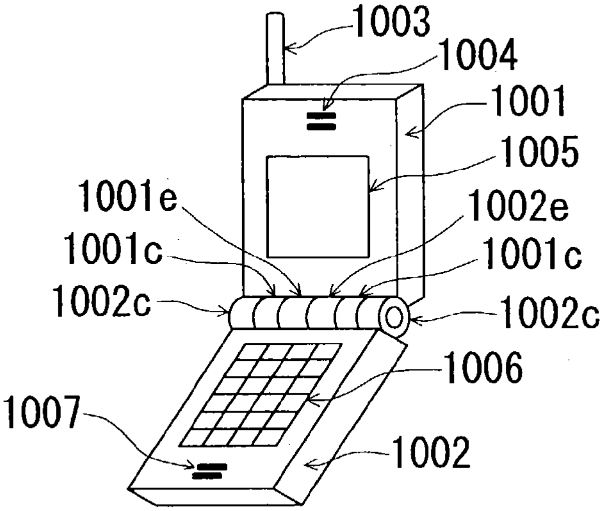
FIGS. 10A and 10B are, respectively, a perspective view and a fragmentary exploded perspective view showing an arrangement of a third prior art cellular phone terminal.
Figure 10B:
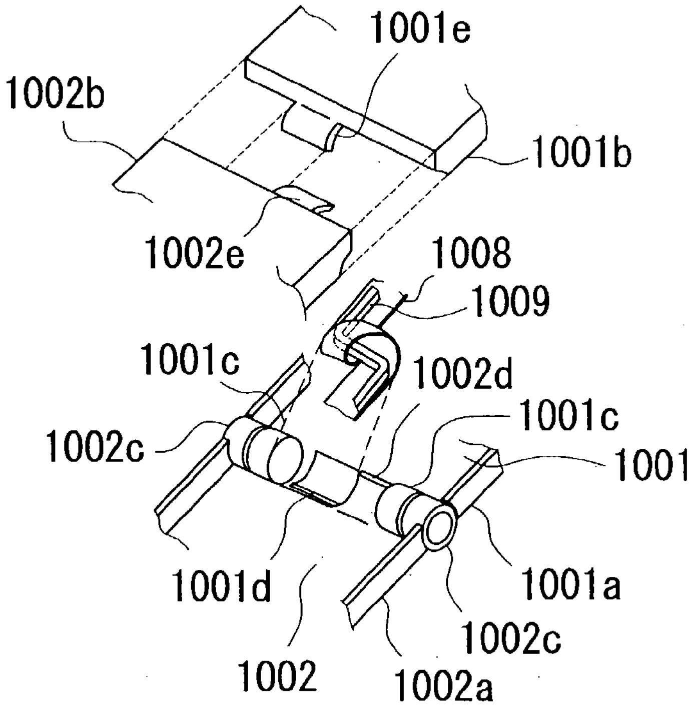

When a conventional foldable cellular phone terminal has been unfolded, the conventional cellular phone terminal takes a straight shape as shown in FIGS. 8A and 8B and thus, is held at different positions by users. Thus, by providing the concave first finger grip portion 502*a* or the concave second finger grip portion 502*b* on the lower housing 502 as shown in FIGS. 5A and 5B, position for holding the cellular phone terminal can be restricted to the lower housing 502, so that it is possible to prevent deterioration of antenna characteristics due to holding of the cellular phone terminal by a hand.

Meanwhile, in this embodiment, the concave finger grip portions are provided at an upper portion of the lower housing as an example but are not limited to this example. Hence, it is needless to say that the same effect can be gained also by widening a lower portion of the lower housing relative to a neighborhood of the hinge of the lower housing.

Meanwhile, the finger grip portion may have such a shape as the finger grip portion 605*a* in FIG. 6B. In this case, if the upper housing 604 having a shape corresponding to that of the lower housing 605 is provided, design of the folded cellular phone terminal is upgraded. In addition, if a convex projection is provided on the hinge 606, the finger can readily grip the finger grip portion 605*a*.

If the cellular phone terminal is designed to a shape associated with a shell or an egg, a width of the neighborhood of the hinge naturally can be made narrower than a maximum width of the hosing. In this case, the neighborhood of the hinge of the lower housing is considered to function as a finger grip portion.

Meanwhile, if in addition to the finger grip portion of the lower housing, a neighborhood of the hinge of the upper housing is formed into a shape similar to that of the finger grip portion, it can be expected that an upper limit for holding the cellular phone terminal is set. This setting of the upper limit is especially useful for a case in which the cellular phone terminal is of small size.

In this embodiment, the finger grip portion is concave as observed in a front elevational view of FIG. 5A by way of example but may be naturally provided also on a rear face of the cellular phone terminal.

The monopole antenna is not necessarily used exclusively for reception. In this embodiment, the monopole antenna is used in combination with the external antenna by way of example but can be, needless to say, used for both transmission and reception. In this case, it is possible to perform diversity reception by combining the monopole antenna with another built-in antenna.

Meanwhile, position of the external antenna is not restricted to the illustrated ones and only the built-in antenna may be naturally employed by eliminating the external antenna.

(Fourth Embodiment)

Figure 7A:
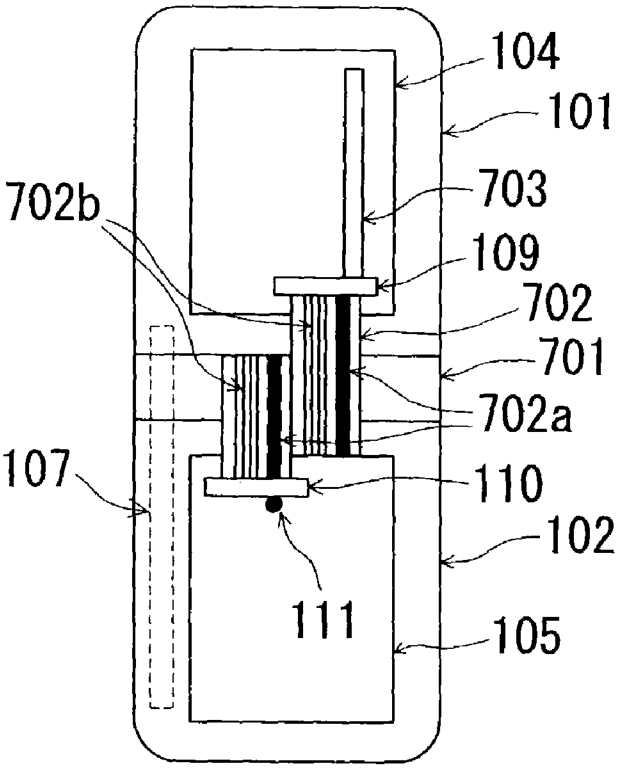
FIGS. 7A and 7B are, respectively, a cutaway front elevational view and a longitudinal sectional view showing an arrangement of a cellular phone terminal according to a fourth embodiment of the present invention.
Figure 7B:
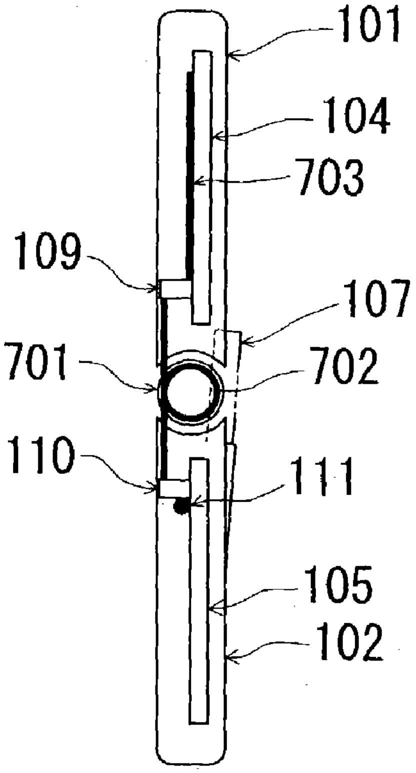

Hereinafter, a fourth embodiment of the present invention is described with reference to FIGS. 7A and 7B. FIGS. 7A and 7B show an example of an arrangement of a cellular phone terminal according to the fourth embodiment of the present invention. In FIGS. 7A and 7B, "701" denotes a hinge, "702" a flexible printed wiring board, "702*a*" a first conductive pattern, "702*b*" a second conductive pattern and "703" a second antenna conductive pattern.

In this arrangement, one turn of the flexible printed wiring board 702 is passed along an inside diameter of a hollow of the hinge 701. At this time, it is vital that the flexible printed wiring board 702 should be disposed such that the external antenna is distant from the first conductive pattern 702*a* and the antenna conductive pattern 703 which constitute a monopole antenna. Namely, it is vital that the lower connector 110 should be disposed more leftwards than the upper connector 109 in case the external antenna 107 is disposed at a left portion of the lower housing 102. As a result, since the external antenna 107 can be made distant from the monopole antenna, the coefficient of correlation decreases and thus, diversity gain is upgraded. Furthermore, in this case, it is considered that the effects are heightened by disposing the antenna conductive pattern 703 at a right portion of the flexible printed wiring board 702.

In this embodiment, the external antenna 107 is disposed at the left portion of the lower housing 102 as an example but is not restricted to this example. Also when the external antenna 107 is disposed at a right portion or an upper portion of the lower housing 102, the same effects can be, needless to say, achieved by making the external antenna 107 distant from the monopole antenna.

Meanwhile, in this embodiment, the flexible printed wiring board 702 is wound one turn as an example but is not restricted to this example. Also when the flexible printed wiring board 702 is not wound one turn, the same effects can be, needless to say, gained by making the external antenna 107 distant from the monopole antenna.

The monopole antenna is not necessarily used exclusively for reception. In this embodiment, the monopole antenna is used in combination with the external antenna by way of example but can be, needless to say, used for both transmission and reception. In this case, it is possible to perform diversity reception by combining the monopole antenna with another built-in antenna.

Meanwhile, position of the external antenna is not restricted to the illustrated one and only the built-in antenna may be naturally employed by eliminating the external antenna.

(Fifth Embodiment)

Figure 11A:
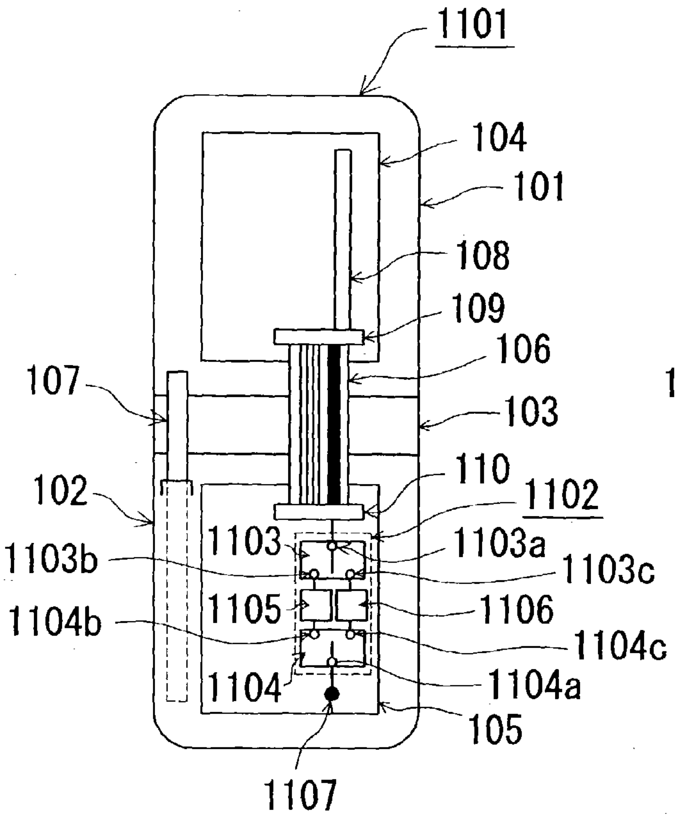
FIGS. 11A and 11B are, respectively, a cutaway rear elevational view and a longitudinal sectional view showing an arrangement of a cellular phone terminal according to a fifth embodiment of the present invention.
Figure 11B:
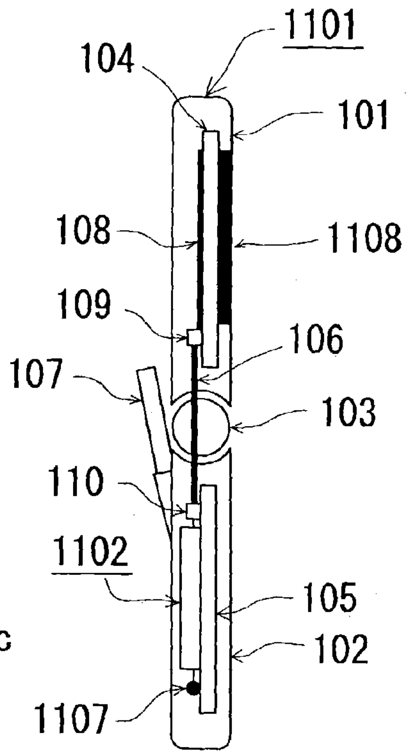

Hereinafter, a fifth embodiment of the present invention is described with reference to FIGS. 11A and 11B in which parts similar to those of FIGS. 1A and i B are designated by their reference numerals. FIGS. 11A and 11B show an example of an arrangement of a cellular phone terminal according to the fifth embodiment of the present invention. In FIGS. 11A and 11B, "1101" denotes a portable radio device, "1102" a matching circuit portion, "1103" a first switching circuit, "1104" a second switching circuit, "1105" a first matching circuit, "1106" a second matching circuit, "1107" an antenna feeding point and "1108" a display.

By way of example, a case is described in which the cellular phone terminal is operated at two frequencies f1 and f2 on the supposition that the frequencies f1 and f2 have a relation of (2f1≈f2). In case the cellular phone terminal is operated at the frequency f1, a length of the conductive pattern 108 and the antenna element on the flexible printed wiring board 106 is preset at an electric length of about (λ/4). In this case, the first switching circuit 1103 is controlled so as to conduct terminals 1103*a* and 1103*b* to each other and the second switching circuit 1104 is controlled so as to conduct terminals 1104*a* and 1104*b* to each other.

Meanwhile, at the frequency f1, the first matching circuit 1105 is arranged to attain conjugated matching of an impedance in which the circuit is observed from the antenna feeding point 1107. At the time of transmission, a signal having the frequency f1 is inputted from the antenna feeding point 1107 to the terminal 1104*a* of the second switching circuit 1104 so as to be applied to the first matching circuit 1105 via the terminal 1104*b*. An output signal from the first matching circuit 1105 is inputted to the terminal 1103*b* of the first switching circuit 1103 and is radiated, through the terminal 1103*a*, to space from the antenna element on the flexible printed wiring board 106 and the conductive pattern 108. At the time of reception, the signal having the frequency f1 follows the path of transmission reversely so as to be inputted to the antenna feeding point 1107. At this time, since the antenna element on the flexible printed wiring board 106 and the conductive pattern 108 act as a (λ/4) monopole antenna, characteristics of wider band can be obtained as compared with those of a (λ/2) monopole antenna.

Then, in case the cellular phone terminal is operated at the frequency f2, the first switching circuit 1103 is controlled so as to conduct terminals 1103*a* and 1103*c* to each other and the second switching circuit 1104 is controlled so as to conduct terminals 1104*a* and 1104*c* to each other. Meanwhile, at the frequency f2, the second matching circuit 1106 is arranged to attain conjugated matching of an impedance in which the circuit is observed from the antenna feeding point 1107. At the time of transmission, a signal having the frequency f2 is inputted from the antenna feeding point 1107 to the terminal 1104*a* of the second switching circuit 1104 so as to be applied to the second matching circuit 1106 via the terminal 1104*c*. An output signal from the second matching circuit 1106 is inputted to the terminal 1103*c* of the first switching circuit 1103 and is radiated, through the terminal 1103*a*, to space from the antenna element on the flexible printed wiring board 106 and the conductive pattern 108. At the time of reception, the signal having the frequency f2 follows the path of transmission reversely so as to be inputted to antenna feeding point 1107. At this time, since the antenna element on the flexible printed wiring board 106 and the conductive pattern 108 act as a (λ/2) monopole antenna, quantity of electric current flowing through the board can be lessened as compared with that of a (λ/4) monopole antenna.

When the antenna acting as a (λ/4) monopole antenna is operated as a (λ/4) monopole antenna, its resonance can be obtained at the different frequencies by effecting changeover of the matching circuits as described above. Especially, since an antenna of a (λ/4) resonance system can achieve characteristics of wider band as compared with those of an antenna of a (λ/2) resonance system, the resonance is suitable for a case in which in a plurality of the frequencies, the lower frequency has a wide band. For example, the resonance is suitable for a composite device having a 800-MHz band and a 1.5-GHz band in personal digital cellular (PDC) system and a composite device of PDC system and wideband code division multiple access (W-CDMA) system. Since quantity of electric current flowing through the housing or the board can be lessened by the antenna of the (λ/2) resonance system more than the antenna of the (λ/4) resonance system, it is possible to restrain deterioration of antenna characteristics of the (λ/2) resonance system, which is caused by holding the cellular phone terminal by a hand. As the frequency is raised further, propagation loss becomes larger. Thus, if the higher frequency in a plurality of the frequencies is used for the (λ/2) resonance system, antenna characteristics at the time of use of the human body can be improved.

The monopole antenna is not necessarily used exclusively for reception. In this embodiment, the monopole antenna is used in combination with the external antenna by way of example but can be, needless to say, used for both transmission and reception. In this case, it is possible to perform diversity reception by combining the monopole antenna with another built-in antenna.

Meanwhile, position of the external antenna is not restricted to the illustrated one and only the built-in antenna may be naturally employed by eliminating the external antenna.

(Sixth Embodiment)

Figure 12A:
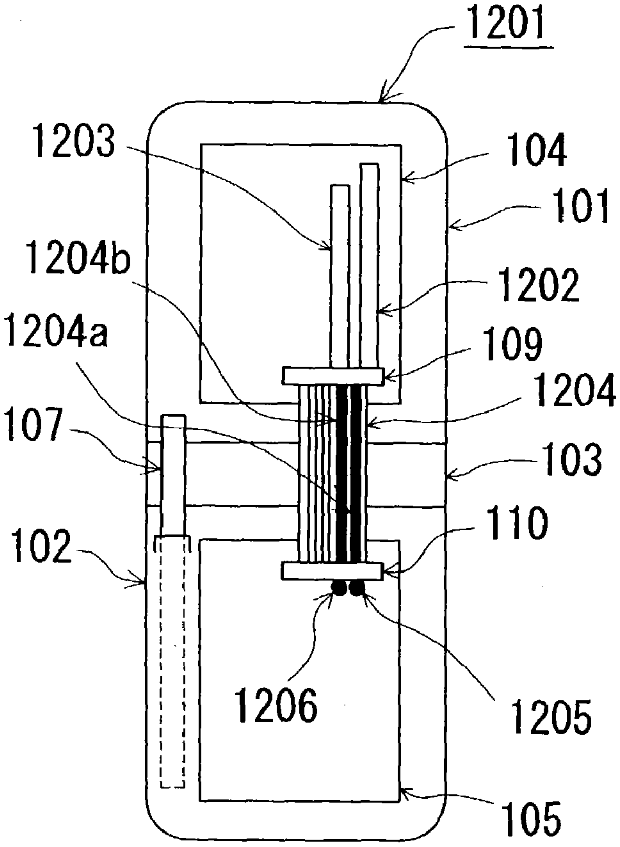
FIGS. 12A and 12B are, respectively, a cutaway rear elevational view and a longitudinal sectional view showing an arrangement of a cellular phone terminal according to a sixth embodiment of the present invention.
Figure 12B:
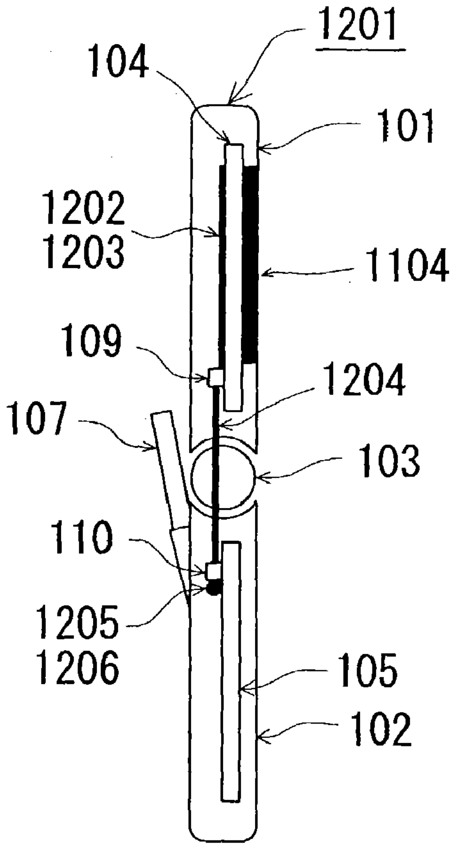

Hereinafter, a sixth embodiment of the present invention is described with reference to FIGS. 12A and 12B in which parts similar to those of FIGS. 1A and 1B and FIGS. 11A and 11B are designated by their reference numerals. FIGS. 12A and 12B show an example of an arrangement of a cellular phone terminal according to the sixth embodiment of the present invention. In FIGS. 12A and 12B, "12011" denotes a portable radio device, "1202" a first antenna element, "1203" a second antenna element, "1204" a flexible printed wiring board, "1205" a first antenna feeding point and "1206" a second antenna feeding point.

As an example, a case is described in which the antennas act as (λ/4) monopole antennas at the two frequencies f1 and f2, respectively. In this case, the frequencies f1 and f2 are not required to satisfy the relation of (2f1≈f2). In case the cellular phone terminal is operated at the frequency f1, a length of the first antenna element 1202 and a first conductive pattern 1204*a* on the flexible printed wiring board 1204 is preset at an electric length of about (λ/4). At the time of transmission, a signal having the frequency f1 and inputted from the first antenna feeding point 1205 is radiated to space from the first conductive pattern 1204*a* on the flexible printed wiring board 1204 and the first antenna element 1202. At the time of reception, a reception signal having the frequency f1 and delivered from the first antenna element 1202 and the first conductive pattern 1204*a* on the flexible printed wiring board 1204 is inputted from the first antenna feeding point 1205 to a reception circuit.

In case the cellular phone terminal is operated at the frequency f2, a length of the second antenna element 1203 and a second conductive pattern 1204*b* on the flexible printed wiring board 1204 is preset at an electric length of about (λ/4). At the time of transmission, a signal having the frequency f2 and inputted from the second antenna feeding point 1206 is radiated to space from a second conductive pattern 1204*b* on the flexible printed wiring board 1204 and the second antenna element 1203. At the time of reception, a reception signal having the frequency f2 and delivered from the second antenna element 1203 and the second conductive pattern 1204*b* on the flexible printed wiring board 1204 is inputted from the second antenna feeding point 1206 to the reception circuit.

By using a plurality of the antenna elements and the conductive patterns selectively as described above, the cellular phone terminal is capable of dealing with a plurality of frequency bands. By setting the length of the antenna element and the conductive pattern at an electric length of about (λ/4) in each frequency band, it is possible to obtain wide-band characteristics in each frequency band.

In this embodiment, the two antennas are provided but the number of the antenna is not restricted to two. Thus, at least two antennas may be employed as constituent elements.

Meanwhile, in this embodiment, each of both of the two antennas includes as its constituent element the antenna element on the upper printed board but the present invention is not restricted to this arrangement. Hence, at least one of a plurality of the antennas may include as its constituent elements the antenna element on the upper printed board and the conductive pattern on the flexible printed wiring board.

Furthermore, in this embodiment, only a case in which the electric length is about (λ/4) has been described but the present invention is not restricted to this case. Also in the case where the electric length is about (λ/2), it is likewise possible to cope with a plurality of the frequency bands by using a plurality of the antenna elements and the conductive patterns. In this case, electric current flowing through the housing and the board can be lessened and antenna characteristics at the time of use of the human body are probably improved.

Meanwhile, it is, needless to say, possible to use by combining at least two of cases in which the electric length of the antenna element and the conductive pattern is about (λ/4), (λ/2) and (3λ/4). For example, in case a composite device of the PDC system having a 800-MHz band and a 1.5 MHz band is materialized, it is naturally considered that in the 800-MHz band having a quite wide fractional band of about 17%, the composite device functions as a (λ/4) monopole antenna in order to obtain wide-band characteristics and in the 1.5-MHz band having a comparatively narrow fractional band of about 5%, the composite device functions as a (λ/2) monopole antenna in which deterioration of characteristics at the time of use of the human body can be lessened.

Meanwhile, in case the (λ/4) monopole antenna and the (λ/2) monopole antenna are arranged side by side, a feeding point of the (λ/4) monopole antenna is disposed at an antinode of standing wave of electric current but a feeding point of the (λ/2) monopole antenna is disposed at a node of standing wave of electric current, so that electromagnetic coupling becomes smaller than a case in which the two (λ/4) monopole antennas are arranged side by side and thus, isolation of the antennas from each other can be improved.

Meanwhile, in case a plurality of the antenna elements and the conductive patterns are arranged adjacent to each other, such a problem arises that isolation of the antennas from each other deteriorates. However, this problem may be solved by, for example, an arrangement shown in FIGS. 13A and 13B in which the antennas are arranged away from each other physically. Meanwhile, parts similar to those of FIGS. 1A, 1B, 11A, 11B, 12A and 12B are designated by their reference numerals.

Figure 13A:
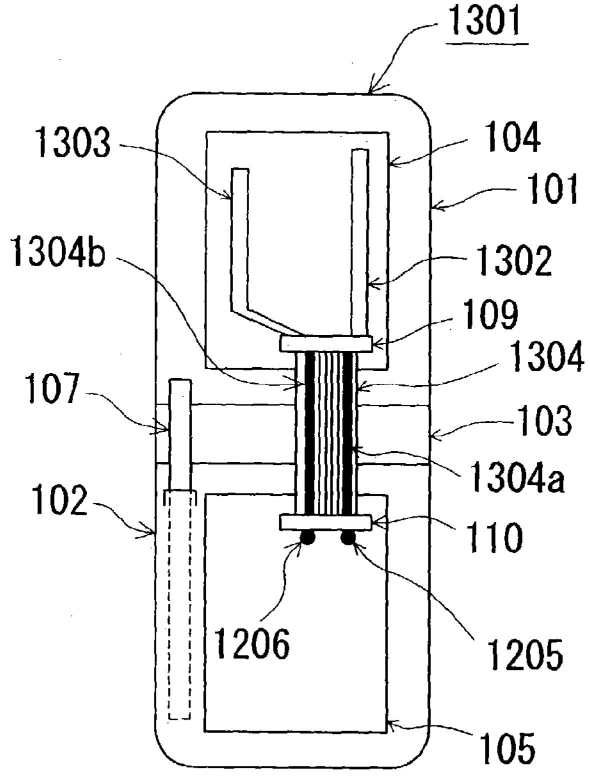
FIGS. 13A and 13B are, respectively, a cutaway rear elevational view and a longitudinal sectional view showing an arrangement of a cellular phone terminal which is a first modification of the cellular phone terminal of FIG. 12.
Figure 13B:
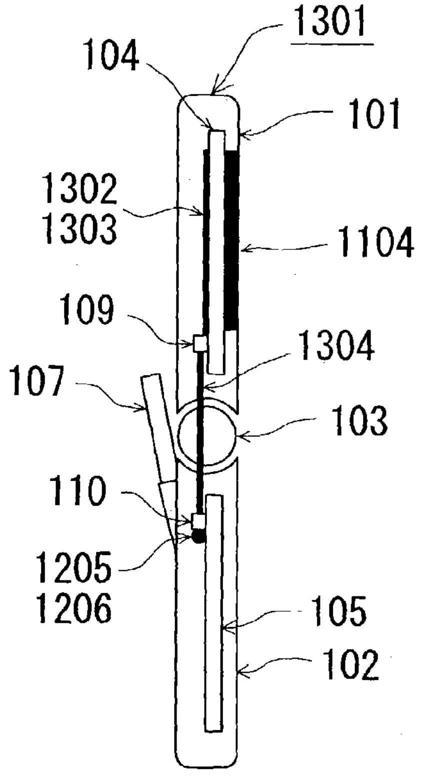

In FIGS. 13A and 13B, "1301" denotes a portable radio device, "1302" a first antenna element, "1302" a second antenna element and "1304" a flexible printed wiring board. In this case, it is important that a first conductive pattern 1304*a* and a second conductive pattern 1304*b* are disposed at outermost portions so as to be farthest from each other in the flexible printed wiring board 1304. Meanwhile, since the antenna elements are disposed away from each other on the upper printed board 104, electromagnetic coupling therebetween weakens further, so that it is expected that isolation therebetween can be improved.

Figure 14A:
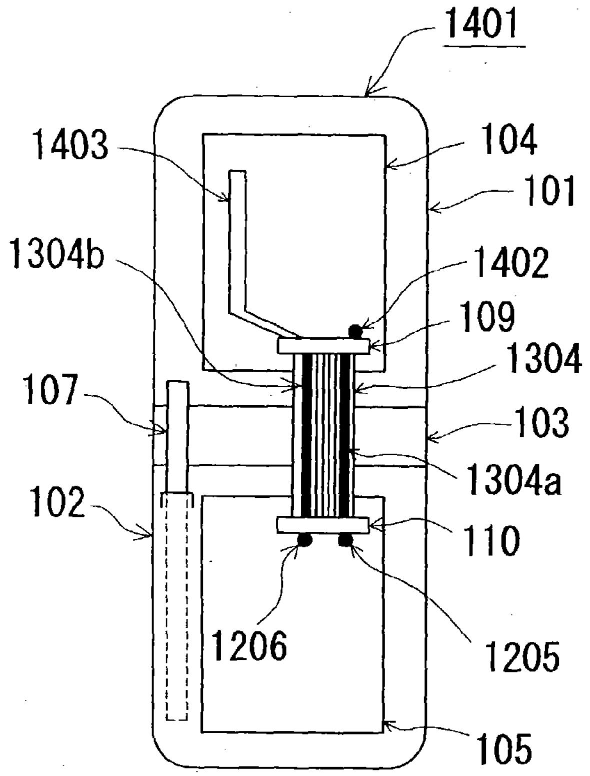
FIGS. 14A and 14B are, respectively, a cutaway rear elevational view and a longitudinal sectional view showing an arrangement of a cellular phone terminal which is a second modification of the cellular phone terminal of FIG. 12
Figure 14B:
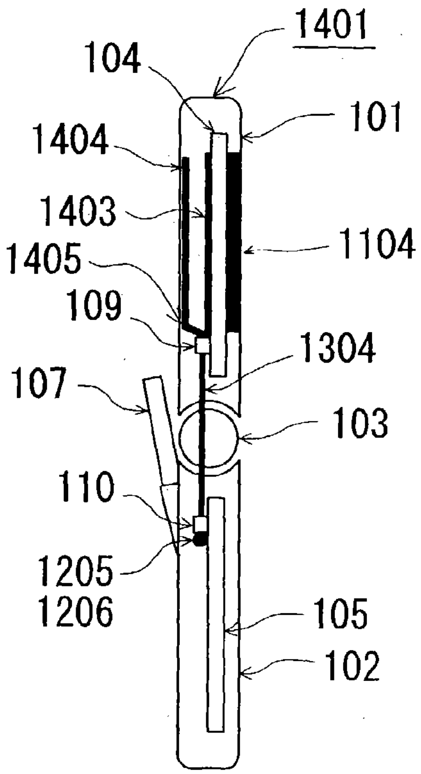
Figure 14C:
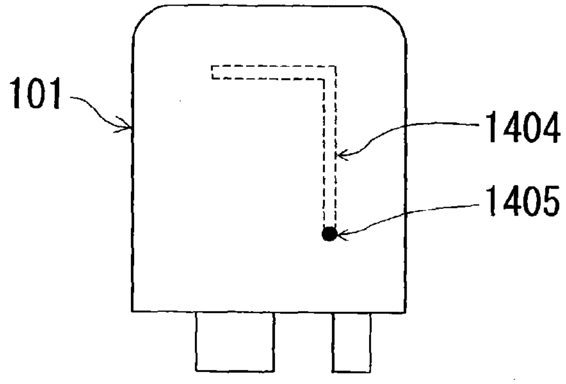
FIG. 14C is a schematic rear elevational view of an upper housing of this cellular phone terminal.

Meanwhile, as in an arrangement shown in FIGS. 14A, 14B and 14C, it is considered that antenna elements are disposed further away from each other. Meanwhile, parts similar to those of FIGS. 1A and 1B and FIGS. 11A and 11B to FIGS. 13A and 13B are designated by their reference numerals.

In FIGS. 14A, 14B and 14C, "1401" denotes a cellular phone terminal, "1402" a land pattern, "1403" a first antenna element, "1404" a second antenna element and "1405" a spring contact point. At this time, the second antenna element 1404 disposed in the upper housing 101 is electrically connected to the land pattern 1402 on the upper printed board 104 via the spring contact point 1405 and is connected to the first feeding point 1205 through the first conductive pattern 1304*a* of the flexible printed wiring board 1304. In this case, since the second antenna element 1404 is disposed at an inside of the upper housing 101, the second antenna element 1404 can-be spaced away from the first antenna element 1403, so that it is expected that isolation therebetween can be improved. Meanwhile, if a low-frequency antenna is constituted by the second antenna element 1404, the spring contact point 1405, the land pattern 1402 and the first conductive pattern 1304*a*, the antenna can be spaced away from a head at the time of use of the human body, so that not only deterioration of antenna characteristics can be restrained but a specific absorption rate (SAR) value can be reduced. In case it is intended to lower the SAR value, peak value of the SAR generally rises as frequency becomes higher. Therefore, by disposing a high-frequency antenna into the housing, the SAR value can be reduced effectively.

Figure 15A:
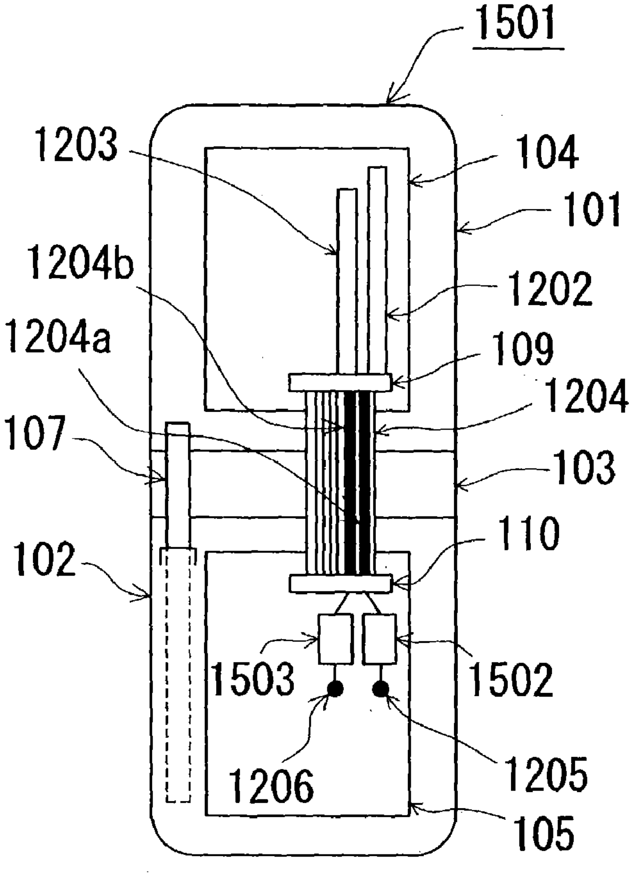
FIGS. 15A and 15B are, respectively, a cutaway rear elevational view and a longitudinal sectional view showing an arrangement of a cellular phone terminal which is a third modification of the cellular phone terminal of FIG. 12.
Figure 15B:
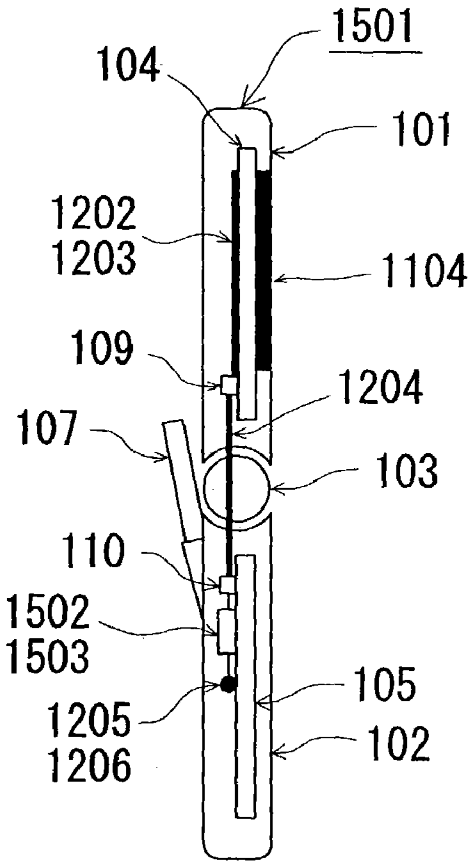

In order to improve isolation between the antennas, another method is considered in which a matching circuit is used as shown in FIGS. 15A and 15B. Meanwhile, parts similar to those of FIGS. 1A, 1B, 11A, 11B, 12A and 12B are designated by their reference numerals.

In FIGS. 15A and 15B, "1501" denotes a portable radio device, "1502" a first matching circuit and "1503" a second matching circuit. As one example, a case is described in which two (λ/4) monopole antennas operate at frequencies f1 and f2, respectively. It is supposed here that when the first antenna element 1202 and the first conductive pattern 1204*a* resonate at the frequency f1 and the second antenna element 1203 and the second conductive pattern 1204*b* resonate at the frequency f2, the relation of (f1<f2) is satisfied. In this case, it is considered that the first matching circuit 1502 inserted between the first conductive pattern 1204*a* and the first antenna feeding point 1205 is formed by a low-pass filter. Thus, a signal emitted into space from the second antenna element 1203 and the second conductive pattern 1204*b* and having a frequency higher than the frequency f1 is less likely to be received by the first antenna element 1202 and the first conductive pattern 1204*a*. Therefore, in a signal inputted from the first antenna feeding point 1205, a signal component having a frequency higher than the frequency f1 is damped by the first matching circuit 1502, so that isolation is improved. Meanwhile, it is natural that the same effect can be gained also when the first matching circuit 1502 is formed by a high-stop filter.

Meanwhile, it is considered that the second matching circuit 1503 inserted between the second conductive pattern 1204*b* and the second antenna feeding point 1206 is formed by a high-pass filter. Thus, a signal emitted into space from the first antenna element 1202 and the first conductive pattern 1204*a* and having a frequency lower than the frequency f2 is less likely to be received by the second antenna element 1203 and the second conductive pattern 1204*b*. Therefore, in a signal inputted from the second antenna feeding point 1206, a signal component having a frequency lower than the frequency f2 is damped by the second matching circuit 1503, so that isolation is improved. Meanwhile, it is natural that the same effect can be achieved also when the second matching circuit 1503 is formed by a low-stop filter.

Meanwhile, the monopole antenna is not necessarily used exclusively for reception. In this embodiment, the monopole antenna is used in combination with the external antenna by way of example but can be, needless to say, used as an antenna for both transmission and reception. In this case, it is possible to perform diversity reception by combining the monopole antenna with another built-in antenna.

Meanwhile, position of the external antenna is not restricted to the illustrated one and only the built-in antenna may be naturally employed by eliminating the external antenna.

As is clear from the foregoing description of the cellular phone terminal of the present invention, since the monopole antenna is constituted by the conductive pattern on the flexible printed wiring board and the conductive pattern on the printed board, electric current flowing through the antenna element on the flexible printed wiring board can be made smaller than a case in which only the conductive pattern on the flexible printed wiring board is used as an antenna, so that changes of characteristics of the cellular phone terminal upon its unfolding and folding can be restrained and introduction of noise into other signal conductor lines can be restricted.

Meanwhile, if the signal conductor lines except for the antenna of the flexible printed wiring board is formed by a microstrip line or a triplate line, the influence of noise introduction exerted by the antenna can be restrained.

Furthermore, if the recessed finger grip portion is provided on the lower housing, only the lower housing can be gripped without gripping the upper housing when the cellular phone terminal is held by a hand, so that deterioration of antenna characteristics in hand-held state of the cellular phone terminal can be prevented.

In addition, if the flexible printed wiring board is provided such that the monopole antenna is spaced away from the external antenna, coefficient of correlation of the external antenna and the monopole antenna is reduced, so that diversity gain can be improved.

Meanwhile, since the antenna functioning as the antenna of the (λ/4) resonance system is capable of functioning as the antenna of the (λ/2) resonance system upon changeover of the matching circuit, it is possible to cover a plurality of frequency bands. Meanwhile, if a plurality of the antennas are formed by a plurality of the antenna elements and the conductive patterns, it is possible to cover a plurality of frequency bands. In this case, if the antennas are spaced away from each other or the matching circuit is inserted, isolation can be improved and antenna characteristics can be improved.

The invention claimed is:

1. A cellular phone terminal comprising:

an upper housing which includes an upper printed board;

a lower housing which includes a lower printed board;

a hinge; and a flexible printed wiring board;

wherein the upper printed board and the lower printed board are foldably connected to each other by the flexible printed wiring board, and the upper housing and the lower housing are rotated to each other about the hinge such that the cellular phone terminal is foldable;

wherein unbalanced type linear or platelike antennas are formed on the flexible printed wiring board and one of the upper printed board and the lower printed board, and are fed from a feeding point of the other of the upper printed board and the lower printed board.

2. A cellular phone terminal as claimed in claim 1, wherein the flexible printed wiring board comprises a strip line including a ground line and a signal conductor line, and a further signal conductor line functioning as an antenna.

3. A cellular phone terminal as claimed in claim 1, wherein the flexible printed wiring board comprises a triplate line including two ground lines and a signal conductor line interposed between the ground lines, and a further signal conductor line functioning as an antenna.

4. A cellular phone terminal as claimed in claim 1, wherein a hollow is formed at a central portion of the hinge and one turn of the flexible printed wiring board is passed along an inside diameter of the hollow.

5. A cellular phone terminal as claimed in claim 4, further comprising:

an external antenna for both transmission and reception, which is provided on the lower housing such that a point of connection between the flexible printed wiring board and the lower printed board is disposed more adjacent to the external antenna than a point of connection between the flexible printed wiring board and the upper printed board is.

6. A cellular phone terminal as claimed in claim 1, further comprising:

a switching circuit; and a plurality of matching circuits of the linear antennas, which are changed over by the switching circuit.

7. A cellular phone terminal as claimed in claim 6, wherein the linear antennas have an electric length equal to about (1/4) of their wavelength and each function as a (λ/2) resonator for a wavelength of a different frequency band upon changeover of the matching circuit.

8. A cellular phone terminal as claimed in claim 1, wherein at least two further linear or platelike antennas are formed on the flexible printed wiring board and one of the upper printed board and the lower printed board and resonate at different frequencies, respectively.

9. A cellular phone terminal as claimed in claim 8, wherein the further linear or platelike antennas include at least two of an antenna having an electric length equal to (1/4) of its wavelength, an antenna having an electric length equal to about (1/2) of its wavelength and an antenna having an electric length equal to (3/4) of its wavelength.

10. A cellular phone terminal as claimed in claim 8, wherein the two further linear or platelike antennas formed on the flexible printed wiring board are, respectively, disposed at opposite outermost sides.

11. A cellular phone terminal as claimed in claim 8, wherein at least one of the further linear or platelike antennas includes a linear element disposed on an inner face of the upper housing or an inner face of the lower housing.

12. A cellular phone terminal as claimed in claim 8, wherein one of the further linear or platelike antennas has a lowest resonance frequency in the further linear or platelike antennas and is connected to a feeding point via a low-pass filter.

13. A cellular phone terminal as claimed in claim 8, wherein a further one of the further linear or platelike antennas has a highest resonance frequency in the further linear antennas and is connected to a feeding point via a high-pass filter.

14. A cellular phone terminal as claimed in claim 8, wherein one of the further linear or platelike antennas has a lowest resonance frequency in the further linear or platelike antennas and is connected to a feeding point via a high-stop filter.

15. A cellular phone terminal as claimed in claim 8, wherein one of the further linear or platelike antennas has a highest resonance frequency in the further linear or platelike antennas and is connected to a feeding point via a low-stop filter.

16. A cellular phone terminal as claimed in claim 1, which is foldable into two sections, wherein the lower housing is provided with a recessed finger grip portion.

* * * * *